US011339313B2

(12) United States Patent
Horito et al.

(10) Patent No.: US 11,339,313 B2
(45) Date of Patent: May 24, 2022

(54) ADHESIVE (71) Applicant: WOOD ONE CO., LTD., Hatsukaichi (JP)

(72) Inventors: Masayoshi Horito, Hatsukaichi (JP); Naoko Kurushima, Hatsukaichi (JP); Tomoyuki Matsumae, Hatsukaichi (JP); Yoshikazu Yazaki, Moorabbin (AU)

(73) Assignee: WOOD ONE CO., LTD., Hatsukaichi (JP)

( * ) Notice: Subject to any disclaimer, the term of this patent is extended or adjusted under 35 U.S.C. 154(b) by 114 days.

(21) Appl. No.: 16/608,091

(22) PCT Filed: Apr. 25, 2018

(86) PCT No.: PCT/JP2018/016874
§ 371 (c)(1),
(2) Date: Oct. 24, 2019

(87) PCT Pub. No.: WO2018/199190
PCT Pub. Date: Nov. 1, 2018

(65) Prior Publication Data
US 2020/0095482 A1 Mar. 26, 2020

(30) Foreign Application Priority Data
Apr. 25, 2017 (JP) .............................. JP2017-086627

(51) Int. Cl.
*C09J 11/08* (2006.01)
*B27D 1/06* (2006.01)
*B32B 7/12* (2006.01)
*B32B 21/13* (2006.01)
*C08J 3/00* (2006.01)
*C09J 161/06* (2006.01)

(52) U.S. Cl.
CPC .................. *C09J 11/08* (2013.01); *B27D 1/06* (2013.01); *B32B 7/12* (2013.01); *B32B 21/13* (2013.01); *C08J 3/005* (2013.01); *C09J 161/06* (2013.01); *C08J 2361/10* (2013.01); *C08J 2401/02* (2013.01)

(58) Field of Classification Search
CPC ....... C08L 97/02; C09J 161/06; C09J 161/24; C09J 161/28
See application file for complete search history.

(56) References Cited

U.S. PATENT DOCUMENTS

| 3,268,460 A * | 8/1966 | Miller | C09J 161/06 |
| | | | 527/100 |
| 4,169,077 A * | 9/1979 | Hartman | C08G 8/28 |
| | | | 428/529 |
| 4,469,858 A * | 9/1984 | Chen | C08G 16/0293 |
| | | | 528/129 |
| 4,915,766 A * | 4/1990 | Baxter | B32B 7/12 |
| | | | 156/335 |
| 2003/0230653 A1* | 12/2003 | Nakamoto | C09J 197/02 |
| | | | 241/24.1 |
| 2011/0262760 A1* | 10/2011 | Breyer | C08L 61/04 |
| | | | 428/535 |
| 2018/0231086 A1* | 8/2018 | Kuroe | B27N 3/28 |
| 2018/0312735 A1* | 11/2018 | Horito | C09J 193/00 |

FOREIGN PATENT DOCUMENTS

| CN | 103361013 A | 10/2013 |
| GB | 802 323 | 10/1958 |
| JP | 47-47293 B1 | 11/1972 |
| JP | 48-32418 B1 | 10/1973 |
| JP | 2003-261853 A | 9/2003 |
| JP | 2006-70081 A | 3/2006 |
| JP | 4683258 B2 | 5/2011 |
| JP | 2011-251527 A | 12/2011 |
| JP | 5122668 B2 | 1/2013 |
| JP | 2016-138220 A | 8/2016 |
| WO | WO 2017/069271 A1 | 4/2017 |

OTHER PUBLICATIONS

Extended European Search Report dated Dec. 9, 2020, in European Patent Application No. 18790127.7.
International Preliminary Report on Patentability for PCT/JP2018/016874 (PCT/IPEA/409) dated Apr. 23, 2019.
International Search Report for PCT/JP2018/016874 dated Jun. 12, 2018.
Nair et al., "Bark derived submicron-sized and nano-sized cellulose fibers: From industrial waste to high performance materials", Carbohydrate Polymers, 2015, vol. 134, pp. 258-266.
Nair et al., "Effect of high residual lignin on the thermal stability of nanofibrils and its enhanced mechanical performance in aqueous environments", Cellulose, 2015, vol. 22, pp. 3137-3150.
Written Opinion of the International Preliminary Examining Authority for PCT/JP2018/016874 (PCT/IPEA/408) dated Mar. 19, 2019.
Written Opinion of the International Searching Authority for PCT/JP2018/016874 (PCT/ISA/237) dated Jun. 12, 2018.
Yano et al., "Production of acacia bark powder having a high tannin content and its application to adhesive", Wood Industry, 2005, vol. 60, No. 10, pp. 478-482, total 6 pages.

* cited by examiner

*Primary Examiner* — Liam J Heincer
(74) *Attorney, Agent, or Firm* — Birch, Stewart, Kolasch & Birch, LLP (57) ABSTRACT

Provided is an adhesive that effectively utilizes bark and demonstrates superior adhesion performance. The adhesive of the present invention comprises at least one adhesive resin (A) selected from the group consisting of phenolic resin, urea resin, and melamine resin, and finely pulverized bark (B) comprising cellulose nanofibers.

7 Claims, 2 Drawing Sheets

ADHESIVE

FIELD OF THE INVENTION

The present invention relates to an adhesive comprising finely pulverized bark.

BACKGROUND ART

Conventionally, phenolic resin adhesives, obtained by a condensation reaction of phenol with formaldehyde, for example, have been used as one of the useful adhesives in the production of veneer-based material such as plywood and LVL. Phenolic resin adhesives have superior water resistance and are suitable for outdoor use; however, since their curing temperatures are high in comparison with other adhesives, it is necessary to use veneers having a low moisture content due to susceptibility to the occurrence of so-called "puncturing". Flour as a thickener, calcium carbonate as an extender and soda ash (sodium carbonate) or baking soda (sodium bicarbonate) as a curing agent are basically incorporated in phenolic resin adhesives. In addition, phenolic resin adhesives are often used in the formulation recommended by the manufacturer so as to have a viscosity of 1.5 Pa·s to 3.0 Pa·s (20° C. to 25° C.), and the solid content percentage (liquid glue solid content percentage) in the adhesive is about 55% in such cases.

With respect to the above phenolic resin adhesives, Patent Document 1 describes an invention relating to an adhesive composition for plywood with which puncturing phenomenon during plywood production is inhibited even in the case of using veneers having a high moisture content. This adhesive composition for plywood is obtained by adding *Acacia* bark powder, an inorganic filler and water to an aqueous solution of a resol-type phenolic resin to inhibit an increase in viscosity after preparation.

On the other hand, Patent Document 2 describes an invention relating to a method for producing a powder having a high content of tannin along with the application thereof, and discloses, in Example, formulation examples of adhesives using bark powder of *radiata* pine and *Acacia*.

In addition, Patent Document 3 describes an invention relating to an adhesive for plywood that contains a resol-type phenolic resin, at least one compound selected from the group consisting of lignin and derivatives thereof and tannin and derivatives thereof, and plant powder, and discloses that bark powder is used as the plant powder.

In addition, Non-Patent Document 1 describes research on the production of *Acacia* bark powder having a high tannin content and its application to adhesives, and discloses a formulation example of an adhesive in which *Acacia* bark powder, pMDI, and sodium carbonate or flour are added to a phenolic resin.

In recent years, interest has been focused on the use of wood materials as a renewable resource for the purpose of resolving the problem of depleting fossil resources, and research is being conducted that attempts to extract cellulose nanofiber from the xylem of wood for use as a material. Cellulose nanofibers, demonstrating superior properties such as light weight, high strength, and low thermal expansion, are attracting considerable attention for use as next-generation industrial materials. Although cellulose nanofibers derived from the wood materials are usually taken out from xylem, lignocellulose nanofibers and cellulose nanofibers extracted from the bark of lodgepole pine in Canada are reported as the case where cellulose nanofibers are taken from bark, and a comparison of the properties was made between these and general cellulose nanofibers derived from the wood materials (Non-Patent Documents 2 and 3).

PRIOR ART REFERENCES

Patent Documents

[Patent Document 1] Japanese Patent No. 5122668
[Patent Document 2] Japanese Patent No. 4683258
[Patent Document 3] Japanese Unexamined Patent Publication No. 2006-70081

Non-Patent Documents

[Non-Patent Document 1] Yano, H. and 8 others, Production of *Acacia* bark powder having a high tannin content and its application to adhesive. Wood Industry, 60 (10): 478-482 (2005)
[Non-Patent Document 2] Sandeep, S. Nair and Ning Yan, Effect of high residual lignin on the thermal stability of nanofibrils and its enhanced mechanical performance in aqueous environments. Cellulose, 22: 3137-3150 (2015)
[Non-Patent Document 3] Sandeep, S. Nair and Ning Yan, Bark derived submicron-sized and nano-sized cellulose fibers: From industrial waste to high performance materials. Carbohydrate Polymers, 134: 258-266 (2015)

SUMMARY OF THE INVENTION

Problems to be Solved by the Invention

The bark which is generated during wood processing and not subsequently used contains tannin (condensed tannin) having a high reactivity to formaldehyde, and tannin extracted by hot water from *Acacia* bark or quebracho wood has been used industrially as a raw material of tannin adhesives. Although these adhesive uses tannin extracted from bark, they do not succeed in effectively using bark itself including other ingredients other than tannin.

Patent Documents 1 to 3 and Non-Patent Document 1 describe the direct use of bark powder in the adhesive. In Patent Document 2, however, tannin is further added separately from bark powder. Accordingly, it cannot be said that tannin present in bark powder is effectively utilized for adhesion in the adhesive described in the literature.

In addition, although Patent Document 1, Patent Document 3 and Non-Patent Document 1 describe inventions relating to adhesives using a phenolic resin and bark powder, a proportion of the bark used is low and the bark is insufficiently utilized. In addition to, not only the proportion of the phenolic resin in the liquid glue solids but also the liquid glue solid content percentage is high.

Although in the research described in Non-Patent Documents 2 and 3, when cellulose nanofibers are extracted from bark, extraction with base is conducted in advance, and further bleaching and a delignification process, as required, are conducted and it is stated that cellulose nanofibers having a small fiber diameter can be obtained, it is not disclosed that components contained in the bark are utilized as raw materials of adhesives.

Therefore, an object of the present invention is to provide an adhesive that effectively utilizes bark and demonstrates superior adhesion performance.

Means for Solving the Problems

The inventors of the present invention found that when finely pulverized bark is used directly in an adhesive, an adhesive having superior adhesion performance can be obtained and it is also possible to reduce the amount used of at least one adhesive resin selected from the group consisting of phenolic resins, urea resins and melamine resins, thereby leading to the completion of the present invention.

[1] An adhesive comprising at least one adhesive resin (A) selected from the group consisting of phenolic resins, urea resins and melamine resins, and finely pulverized bark (B) comprising cellulose nanofibers.

[2] The adhesive described in [1], wherein the bark for the component (B) is the bark of a tree species belonging to at least one family selected from the group consisting of Pinaceae, Cupressaceae, Mimosoideae, Fagaceae, Salicaceae, Myrtaceae, Malvaceae, Acanthaceae, Malpighiaceae, Meliaceae, Euphorbiaceae, Sonneratiaceae, and Rhizophoraceae.

[3] The adhesive described in [1] or [2], comprising 20 parts by mass or more of the component (B) in terms of dry matter based on 100 parts by mass of a total of the solid content of the component (A) and the component (B) in terms of dry matter.

[4] The adhesive described in any one of [1] to [3], wherein the bark for the component (B) is *radiata* pine bark, and the adhesive comprises 40 parts by mass or more and less than 90 parts by mass of the component (B) in terms of dry matter based on 100 parts by mass of a total of the solid content of component (A) and the component (B) in terms of dry matter.

[5] A veneer-based material laminated by the adhesive described in any one of [1] to [4].

Effects of the Invention

According to the present invention, an adhesive is provided that effectively utilizes bark and demonstrates superior adhesion performance.

MODE FOR CARRYING OUT THE INVENTION

The adhesive of the present invention comprises at least one adhesive resin (A) selected from the group consisting of phenolic resins, urea resins and melamine resins (also to be referred to as "component (A)" herein), and finely pulverized bark (B) comprising cellulose nanofibers (also to be referred to as "component (B)" herein).

In this specification, "solid content" means non-volatile ingredients, "liquid glue solid percentage" means mass % of all solid contents contained in the whole liquid glue, "solid content percentage of ingredient X" means mass % of a solid content of ingredient X contained in the whole adhesive, "proportion in the solid content" means proportion by mass of each ingredient in the liquid glue solid content, and "liquid glue" means adhesive.

1. At Least One Adhesive Resin (A) Selected from the Group Consisting of Phenolic Resins, Urea Resins and Melamine Resins Phenolic resins, urea resins and melamine resins are resins generally used as the main component of wood adhesives. Among these, phenolic resins are most preferable as an adhesive because they provide adhesives having superior water resistance and a low formaldehyde emission rate. This is because an adhesive using tannin as a raw material also serves as an adhesive having water resistance, thereby enabling it to be combined without impairing the water resistance of phenolic resin adhesives.

There are no particular limitations on the phenolic resins, and novolac-type phenolic resins or resol-type phenolic resins can be used, and resol-type phenolic resins can be used preferably.

The weight average molecular weight of the phenolic resin is preferably 2,000 to 12,000, more preferably 3,000 to 6,000 and even more preferably 3,500 to 5,500. The weight average molecular weight refers to a value determined by measuring an acetylated form of the phenolic resin by gel permeation chromatography (GPC).

Although there are no particular limitations on the solid content percentage of phenolic resins in commercially available products, the solid content percentage is generally 40 mass % to 45 mass %.

2. Finely Pulverized Bark (B) Comprising Cellulose Nanofibers

As is described in the production method described subsequently, the finely pulverized bark (B) comprising cellulose nanofibers is produced by finely pulverizing bark and comprises all components contained in the bark, namely cellulose, hemicellulose, lignin, and carbohydrates other than cellulose and hemicellulose, tannin and other components.

Component (B) may be, but not particularly limited to, in the form of dried finely pulverized bark, in the form of wet finely pulverized bark, in the form of paste finely pulverized bark, or in the form of suspension of finely pulverized bark in water.

Any tree species as far as the condensed tannin contained in the bark thereof can be used for collecting the bark used for component (B) without limitation. For example, bark from a tree species belonging to a family of trees such as the Pinaceae, Cupressaceae, Mimosoideae, Fagaceae, Salicaceae, Myrtaceae, Malvaceae, Acanthaceae, Malpighiaceae, Meliaceae, Euphorbiaceae, Sonneratiaceae, or Rhizophoraceae can be used.

When considering the amount of bark resources and the amount of tannin present in bark extracts, specific examples of tree genera include tree species belonging to the genera *Larix*, *Tsuga*, *Picea*, *Pseudotsuga*, *Pinus*, *Abies*, *Callitris*, *Chamaecyparis*, *Cryptomeria*, *Acacia*, *Stryphnodendron*, *Parkia*, *Quercus*, *Salix*, *Eucalyptus*, *Guazuma*, *Heritiera*, *Avicennia*, *Byrsonima*, *Xylocarpus*, *Excoecaria*, *Sonneratia*, *Bruguiera*, *Ceriops*, *Kandelia*, and *Rhizophora*.

More specific examples of tree species include tree specifies of the Pinaceae family such as *Larix kaempferi* of the genus *Larix*, *Tsuga canadensis* and *Tsuga heterophylla* of the genus *Tsuga*, *Picea jezoensis*, *Picea abies*, and *Picea sitchensis* of the genus *Picea*, *Pseudotsuga menziesii* (Syn. *P. taxifolia*) of the genus *Pseudotsuga*, *Pinus radiata*, *Pinus pinaster*, *Pinus caribaea*, *Pinus sylvestris*, *Pinus nigra*, *Pinus oocarpa*, *Pinus brutia*, *Pinus elliottii*, *Pinus ponderosa*, *Pinus merkusii*, *Pinus contorta*, and *Pinus taeda* of the genus *Pinus*, and *Abies sachalinensis* of the genus *Abies*; tree specifies of the Cupressaceae family such as *Callitris*

*glauca* and *Callitris calcarata* of the genus *Callitris*, *Chamaecyparis obtusa* of the genus *Chamaecyparis*, and *Cryptomeria japonica* of the genus *Cryptomeria*; tree specifies of the Mimosoideae family such as *Acacia maernsii* (Syn. *A. mollissima*), *Acacia mangium* and *Acacia auriculiformis* of the genus *Acacia*, *Stryphnodendron adstringens* of the genus *Stryphnodendron*, and *Parkia biglobosa* of the genus *Parkia*; tree specifies of the Fagaceae family such as *Quercus robur* and *Quercus acutissima* of the genus *Quercus*; tree specifies of the Salicaceae family such as *Salix miyabeana, Salix pet-susu, Salix rorida*, and *Salix sachalinensis* of the genus *Salix*; tree specifies of the Myrtaceae family such as *Eucalyptus diversicolor* and *Eucalyptus crebra* of the genus *Eucalyptus*; tree specifies of the Malvaceae family such as *Guazuma ulmifolia* of the genus *Guazuma* and *Heritiera formes* and *Heritiera littoralis* of the genus *Heritiera*; tree specifies of the Acanthaceae family such as *Avicennia marina* of the genus *Avicennia*; tree specifies of the Malpighiaceae family such as *Byrsonima crassifolia* of the genus *Byrsonima*; tree specifies of the Meliaceae family such as *Xylocarpus moluccensis* and *Xylocarpus granatum* of the genus *Xylocarpus*; tree specifies of the Euphorbiaceae family such as *Excoecaria agallocha* of the genus *Excoecaria*; tree specifies of the Sonneratiaceae family such as *Sonneratia caseolaris* and *Sonneratia alba* of the genus *Sonneratia*; and, tree specifies of the Rhizophoraceae family such as *Bruguiera parviflora, Bruguiera cylindrica*, and *Bruguiera gymnorrhiza* of the genus *Bruquiera, Ceriops tagal* of the genus *Ceriops, Kandelia candel* of the genus *Kandelia*, and *Rhizophora stylosa, Rhizophora mucronata*, and *Rhizophora apiculate* of the genus *Rhizophora*.

Bark obtained from these tree species may be used singly or in combinations of two or more.

Among these, tree species of the genus *Acacia* and genus *Pinus* are preferable from the viewpoints of containing large amounts of tannin in the bark thereof, being plantation trees, and being trees used industrially.

Moreover, the tannin obtained from pine bark has a phloroglucinol-type hydroxy substituents on the A ring of the flavonoid structure serving as the basic structure thereof, and since this results in even greater reactivity with formaldehyde than tannin having a resorcinol-type hydroxyl substituents, tree species of the genus *Pinus* are more preferable to use. And among tree species of the genus *Pinus, Pinus radiata, Pinus pinaster*, and *Pinus caribeae* are particularly preferable from the viewpoint of containing a large amount of tannin in bark extracts thereof, with *Pinus radiata* being most preferable.

Furthermore, the bark has at least outer bark.

Component (B) is finely pulverized bark and comprises cellulose nanofibers.

The size of the finely pulverized bark is such that the average particle size is preferably not more than 30 μm, more preferably not more than 25 μm, even more preferably not more than 20 μm, and especially preferably not more than 15 μm. The maximum particle size of the finely pulverized bark is preferably not more than 300 μm, more preferably not more than 200 μm, even more preferably not more than 100 μm, and especially preferably not more than 50 μm. The average particle size and the maximum particle size of the finely pulverized bark are the average value and maximum value obtained by measuring a water slurry containing 0.25 mass % of finely pulverized bark obtained after 10 minutes ultrasonic treatment by wet type particle size distribution measurement, specifically Laser diffraction/scattering particle size distribution measurement (LA-950, Horiba Ltd.).

The cellulose nanofibers comprised in the finely pulverized bark may be lignocellulose nanofibers having lignin bound thereto, and the average diameter of the cellulose nanofibers or the lignocellulose nanofibers is preferably 1 nm or more and less than 1,000 nm, more preferably 1 nm to 500 nm and even more preferably 1 nm to 100 mm. The average diameter of the cellulose nanofibers or the lignocellulose nanofibers is determined from the average of diameters of at least fifty sample fibers measured from images of finely pulverized bark observed with a scanning electron microscope (SEM).

The finely pulverized bark used in the present invention is effectively used by finely pulverizing bark directly according to the production method described subsequently without carrying out alkaline extraction which removes a large amount of the tannin, or delignification which removes the lignin. Consequently, components contained in the bark can be used in the adhesive, and this is thought to result in the development of superior adhesion performance. Moreover, since it is thought that as a result of finely pulverizing the bark, components such as tannin present in the bark that contribute adhesion performance easily elute into the adhesive, and that when finely pulverizing the bark, a part of the tannin dissolves in water or adheres to the surface of the finely pulverized bark in a drying step after finely pulverized, it is thought to facilitate for the components in the adhesive which contributes adhesion become reactive and result in enhanced adhesion performance.

3. Adhesive

The adhesive of the present invention preferably comprises 20 parts by mass or more, more preferably comprises 20 parts by mass or more and less than 90 parts by mass, and even more preferably 20 parts by mass or more and 85 parts by mass or less of component (B) in terms of dry matter based on 100 parts by mass of a total of the solid content of component (A) and the component (B) in terms of dry matter, more preferably comprises 20 parts by mass or more and less than 50 parts by mass from the viewpoint of improvement of adhesive strength, even more preferably comprises 40 parts by mass or more and less than 60 parts by mass from the viewpoint of workability, even more preferably comprises 40 parts by mass or more and less than 90 parts by mass from the viewpoint of lowering the solid content percentage of component (A) in the liquid glue, even more preferably comprises over 30 parts by mass and less than 60 parts by mass from the viewpoint of reducing the mass of the solid content in the adhesive, and particularly preferably comprises 40 parts by mass or more and 50 parts by mass.

And the component (B) in terms of dry matter comprised in the all solid content in the adhesive of present invention is preferably 20 to 90 mass %, more preferably 30 to 85 mass % and even more preferably 40 to 80 mass %.

Here, the component (B) in terms of dry matter refers to not only the component (B) in dry state but also the component (B) obtained after drying an aqueous suspension of the component (B) according to the method described in the production method described subsequently. Thus, in the case where a water-soluble component has eluted into the aqueous suspension, the mass of the dry matter of the component eluted into the aqueous suspension is included in the mass of the component (B) in terms of dry matter.

The adhesive of the present invention exhibits superior adhesion performance even in a form having a low solid content percentage of the component (A) and a low liquid glue solid content percentage in this manner. The reason for this is that, as a result of finely pulverizing the bark, the components contained in the bark such as tannin that have adhesion performance are in the easily reactive state and able to contribute adhesion performance and the other components are in the state of less inhibiting adhesion performance or able to contribute adhesion performance.

The viscosity of the adhesive is preferably 1.0 to 4.0 Pa·s and more preferably 2.0 to 3.0 Pa·s at 23° C. Viscosity refers to a value measured with a coaxial dual cylinder type rotational viscometer. As a result of making viscosity to be within the aforementioned ranges, the adhesive is able to favorably adhere to the surface of the wood of adherend and is easy to apply thereto. Namely, as a result of making viscosity to be within the aforementioned ranges, the adhesive does not excessively penetrates into the wood, does not have reduced filling of the adhesive into irregularities on the wood surface and wetting, and thus exhibits adequate adhesion performance.

Since the finely pulverized bark has a thickening effect, the liquid glue solid content percentage of the adhesive of the present invention may be reduced, as the content of the component (B) in terms of dry matter increases when a viscosity is set at a specific value. Consequently, the liquid glue solid content percentage can be reduced beyond the liquid glue solid content percentage contained in an general adhesive comprising of component (A), thereby making it possible to reduce liquid glue costs.

In addition to the aforementioned components, water, fillers, colorants, ultraviolet absorbers, antioxidants, curing agents, tackifiers, plasticizers, softening agents, surfactants, antistatic agents, thickeners, bulking agents, pH adjusters, or other known adhesive components may be contained in the adhesive of the present invention as necessary within a range that does not impair the effects of the present invention. Although the adhesive of the present invention demonstrates adequate adhesion performance without adding additives such as flour, calcium carbonate, sodium carbonate, or sodium bicarbonate, the present invention does not preclude the addition thereof.

4. Adhesive Production Method

The method for producing the adhesive of the present invention includes:

step (I) of grinding the bark, step (II) of classifying the ground bark, step (III) of finely pulverizing the ground bark obtained in step (I) or the classified ground bark obtained in step (II), and step (IV) of mixing at least one adhesive resin selected from the group consisting of phenolic resins, urea resins and melamine resins with the finely pulverized bark obtained in step (III), although step (II) is optional.

The method for producing the adhesive of the present invention is characterized by finely pulverizing the bark and using the finely pulverized bark directly as a raw material of the adhesive, and the method for producing the adhesive of the present invention preferably does not include a step of extracting tannin with hot water or base, or a delignification step of removing lignin.

<Step (I): Step for Grinding Bark>

Any known grinding method can be employed to grind the bark. For example, the bark is roughly ground with a garden shredder, and then, while still in that state or after having adjusted to an appropriate moisture content, and pulverized by means of a mill, such as a hammer mill, a Wiley mill, a ball mill, or a roller mill, which is set so as to pulverize the bark into a particle size of preferably 2.5 mm or less, more preferably 2.0 mm or less, further preferably 1.6 mm or less, most preferably 1.0 mm or less, or is finely pulverized into a fibrous form. Although there are no particular limitations thereon, the grinding method is preferably carried out using a method that prevents the bark from reaching a high temperature during grinding, does not degrade components which contribute adhesion in the bark, and allows grinding to be carried out in a short period of time.

<Step (II): Step for Classifying Ground Bark>

The bark that has been ground in step (I) is preferably classified prior to step (III) for improving work efficiency and stabilizing and improving quality of finely pulverized bark.

Although any known classification method can be employed to classify the bark, examples of methods used include the use of a sieving device such as a sieve having openings of an intended particle diameter, a rotary drum screen or a sieve shaker, and the use of a dry classifier or wet classifier such as a gravity classifier, an inertial force classifier or a centrifugal classifier.

An example of classification consists of classifying into three sizes of a diameter of less than 63 μm, diameter of 63 μm to 1 mm, and diameter of greater than 1 mm.

It is considered that particles having a diameter of less than 63 μm obtained by classifying from the powder generated during grinding of the bark in step (I) are used in step (III), and thus finely pulverized bark having a higher tannin concentration can be obtained.

<Step (III): Step for Finely Pulverizing Ground Bark Obtained in Step (I) or Classified Ground Bark Obtained in Step (II)>

The ground bark obtained in step (I) or the classified ground bark obtained in step (II) are immersed in water and then pulverized together with the water in which the bark was immersed using a disk mill, ball mill, bead mill, homogenizer, or refiner so that an aqueous suspension of the finely pulverized bark can be obtained. Furthermore the aqueous suspension can be additionally dried to obtain dry finely pulverized bark.

Although there are no particular limitations, the time of immersing the bark in water is preferably 12 hours or more.

Although there are no particular limitations, the volume of water added to the ground bark or classified ground bark is preferably equal to 1 to 30 times that of the bark from the viewpoint of finely pulverizing work, and more preferably 1 to 15 times from the viewpoint of drying efficiency. And in the case of using the finely pulverized bark in the form of an aqueous suspension without drying, the volume of water may be such a volume that the viscosity of the liquid glue obtained by mixing the suspension with adhesive resin. etc. is the value described above, and is preferably not more than 10 times the volume of the bark, although it depends on the volume of water in the adhesive resin. Furthermore for avoiding excess of water even if mixing with the adhesive resin, etc., containing any volume of water on preparing liquid glue, the volume of water is more preferably not more than 5 times the volume of the bark. Production costs can be reduced by omitting the drying step in the case of using the bark as an aqueous suspension.

As a method for drying the aqueous suspension, a method in which the aqueous suspension is directly dried is adopted. This is for retaining components eluted into the water without degradation. More specifically, a known method such as freeze-drying, vacuum drying, spray drying or hot-air drying can be adopted.

Furthermore, the degree of pulverization of the bark is as has been previously described. Finely pulverized bark obtained in this manner comprises cellulose nanofibers (or lignocellulose nanofibers) having the previously described average fiber diameter. In the case of using a disk mill, for example, to finely pulverize the bark into this size, the gap between the disks of the disk mill is preferably set to 0 μm to 80 μm and finely pulverizing is preferably carried out using 1 to 10 passes repeatedly.

<Step (IV): Step for Mixing at Least One Adhesive Resin Selected from the Group Consisting of Phenolic Resins, Urea Resins, and Melamine Resins with Finely Pulverized Bark Obtained in Step (III)>

The adhesive of the present invention is obtained by mixing at least one adhesive resin selected from the group consisting of phenolic resins, urea resins, and melamine resins, the dried finely pulverized bark or aqueous suspension of finely pulverized bark obtained in step (III), and other components as necessary. Water etc., is generally added to adjust the viscosity of the adhesive within the range previously described. Any known mixing method can be employed for mixing, and mixing may be carried out with heating or cooling as necessary.

5. Applications of Adhesive

The adhesive of the present invention is preferably used to adhere wood. In addition to being used to laminate veneers forming each layer of plywood, LVL or other types of veneer-based material, the adhesive of the present invention can also be used without limitation to adhere or produce wood materials other than veneer-based material, such as laminated wood, wood fiber board, particle board or strand board. Wood, wood material and wood element which are adherend thereof ranging from that having a low moisture content to that having a high moisture content can be used.

EXAMPLES

<Measurement Conditions>

(1) Measurement of Size of Finely Pulverized Bark

Average particle size and standard derivation, and maximum particle size were measured by laser diffraction/diffusion type particle size distribution measurement device (LA-950, HORIBA. Ltd.) which is one of the wet type particle size distribution measurement devices.

(2) Average Fiber Diameter of Cellulose Nanofiber

The average fiber diameter of the cellulose nanofibers was determined from average of diameters of at least fifty sample fibers measured from images of finely pulverized bark observed with a scanning electron microscope (SEM).

(3) Amount of Tannin in Bark

The amount of tannin was measured according to the method indicated below for the classified ground bark having a diameter of less than 63 μm obtained in step (II) described subsequently (also to be referred to as the "classified ground bark") and the finely pulverized bark obtained in step (III) (also to be referred to as the "finely pulverized bark").

<Methanol Extraction>

An extraction thimble with 5 g of the ground classified bark or finely pulverized bark was placed in a Soxhlet extractor followed by the addition of 100 ml of methanol. The Soxhlet extractor was connected to a round-bottomed flask containing 400 ml of methanol and a condenser tube followed by heating with a heating mantle and extracting for 4 hours. After cooling, the extraction thimble was removed from the extractor and dried for 24 hours at 105° C. followed by measuring the weight of each extraction residue. "The weight of the methanol extract" was determined from the difference between the respective weight of the classified ground bark and finely pulverized bark prior to methanol extraction and the weight of the extraction residue. "The yield of the methanol extract" was then determined according to the equation indicated below.

Yield of methanol extract (%)=(weight of methanol extract/weight of classified ground bark or finely pulverized bark prior to methanol extraction)×100

The methanol solution remaining in the extractor and the methanol solution in the round-bottomed flask were combined and recovered. The solvent was then removed from the recovered product using an evaporator followed by the addition of a small amount of water and freeze-drying to obtain a methanol extract. The resulting methanol extract was used to measure the Stiasny value (SV) (%) (a measurement of the amount of tannin).

<Measurement of Stiasny Value (SV)>

After adding 10 ml of water to 100 mg of methanol extract, 2 ml of 37% aqueous formaldehyde solution and 1 ml of 10 N hydrochloric acid were added to the sample followed by heating for 30 minutes at 100° C. (Stiasny reaction). After filtering with a glass filter, the residue was washed with 25 ml of hot water. This washing procedure was repeated three times. The same washing procedure was repeated three times using 25 ml of methanol. The residue present on the glass filter (Stiasny precipitate) was dried for 24 hours at 105° C. followed by measuring the weight thereof for use as "the weight of the Stiasny precipitate". The SV values (%) of the classified ground bark and finely pulverized bark were determined respectively according to the equation indicated below.

SV of methanol extract (%)=(weight of Stiasny precipitate/weight of methanol extract used in Stiasny reaction)×100

In order to provide a more accurate measurement of the amount of tannin, the SV of catechin serving as a reference sample was measured in the same manner, and the adjusted Stiasny values (ASV) (%) were determined as indicated below using the following equation for methanol extract of the classified ground bark and the finely pulverized bark, respectively.

ASV of methanol extract (%)=(SV (%) of methanol extract of classified ground bark or finely pulverized bark/the SV (%) of catechin)×100

<Calculation of Amount of Tannin>

The amount of tannin contained in each of classified ground bark and finely pulverized bark is calculated by multiplying above yield of methanol extraction and ASV.

The amount of tannin (%)=yield of methanol extraction (%)×ASV (%)

(4) Adhesion Performance Test

Adhesion performance test was conducted in accordance with the "Continuous Boiling Test" defined in Japanese Agricultural Standards (JAS) for plywood. That is, test pieces of a prescribed shape in the wet state were subjected to an adhesion strength test (by gripping both ends of the test pieces, tension load shall be applied in the direction of both ends with the loading rate up to 5.880 N/min. until a failure occurs) after immersing the test pieces in boiling water for 72 hours followed by cooling in the water of room temperature, and calculate the average shear strength and average wood failure ratio indicated below. The test result was judged from the average shear strength and average wood failure ratio.

<Average Shear Strength>

Shear strength of each test piece was measured in accordance with the Japanese Agricultural Standards (JAS) for plywood. The average of the shear strengths of 32 test pieces was used to calculate the value of average shear strength.

<Average Wood Failure>

The wood failure of the each test piece was observed visually and was determined. The average of the wood failures of 32 test pieces was used to calculate the value of average wood failure.

<Judgement of Test Results>

Those test pieces for which the aforementioned average shear strength and average wood failure satisfy the values defined in JAS for plywood were judged to be PASS and not satisfy the values were judged to be Fail.

(5) Particle Size

The value of particle size was defined as the value of opening size of the ISO standard sieves used for bark size classification.

(6) Liquid Glue Solid Content Percentage 1 g of adhesive sample was dried by placing it in a blower dryer at 105° C. for 24 hours. The liquid glue solid content percentage (%) was determined from the weight of the adhesive after drying and the weight of the adhesive before drying according to the equation indicated below. Before this determination, it was confirmed the constant weight of the adhesive sample was obtained with the drying condition.

Liquid glue solid content percentage (%)=(weight of the adhesive after drying/the weight of the adhesive before drying)×100

(7) Viscosity of Liquid Glue

Viscosity of the liquid glue at 23° C. was measured using a coaxial dual cylinder type rotational viscometer.

Production Example 1

Production of Finely Pulverized Bark (Step i): Dried *radiata* pine bark was roughly ground with a garden shredder and then pulverized with a hammer mill equipped with a 1 mm opening screen (metallic mesh).

(Step ii): The pulverized bark obtained in Step i was classified using a 63 µm sieve into diameter of less than 63 µm.

(Step iii): 1 kg of bark having a diameter of less than 63 µm obtained in Step ii was immersed in 10 L of water overnight at room temperature followed by being finely pulverized using a disk mill (Supermasscolloider MKZA10-15J, Masuko Sangyo Co., Ltd.) to obtain an aqueous suspension of finely pulverized bark. The resulting aqueous suspension of finely pulverized bark was freeze-dried directly to obtain dry finely pulverized bark. The maximum particle size of the finely pulverized bark was 40 µm, the average particle size of the finely pulverized bark was 10.4 µm, and standard deviation of the finely pulverized bark was 4.8 µm. Furthermore, this finely pulverized bark comprised cellulose nanofibers having an average fiber diameter of 40 nm.

In this case, finely pulverizing the bark with the disk mill was carried out for 10 passes, during which the gap between two disks was decreased stepwise to finally 0 (zero).

Examples 1 to 5

Adhesives were obtained by mixing a phenolic resin (trade name: Deernol D-117, Oshika Corp.) with the finely pulverized bark at proportions of the solid contents in the adhesive shown in Table 2 followed by adjusting the viscosity with water to the values shown in Table 2.

The prepared adhesives were spread onto one surface of a rotary lathe-cut single board made of *radiata* pine at a spread amount of 200 g/m², another rotary lathe-cut board made of *radiata* pine was laminated onto the adhesive-spread surface, still another rotary lathe-cut single board made of *radiata* pine with adhesives of a spread amount of 200 g/m² on one surface was laminated onto one surface of said laminated boards of two layers resulting in laminated boards of three layers and the resulting laminates were subjected to cold pressing for 30 minutes at room temperature and 1 MPa followed by being closed-assembled for 120 minutes and being subjected to hot pressing for 10 minutes at 135° C. and 1 MPa to obtain test specimen of three layers with nearby fiber direction of single board being right angle.

Test pieces were cut off from the test specimen and then underwent adhesion performance test. The results are shown in Table 2.

Examples 6 to 8

Adhesives were obtained so as to have the compositions shown in Table 2.

The obtained adhesives were spread onto one surface of a rotary lathe-cut boards made of *radiata* pine at a spread amount of 180 g/m², also spread adhesive onto another rotary lathe-cut board made of *radiata* pine at a spread amount of 180 g/m², and then laminating the two boards by joining the adhesive-spread surfaces thereof to obtain laminates. The obtained adhesives were spread onto one surface of still another rotary lathe-cut single board made of *radiata* pine at a spread amount of 180 g/m² and the obtained adhesives were spread onto one surface of the laminated boards of two layers at a spread amount of 180 g/m² and then laminating the two boards by joining the adhesive-spread surfaces thereof to obtain laminates of three layers. Test specimen of laminates of three layers was obtained in the same manner of Example 1 except above procedure. Test pieces were cut off from the test specimen and then underwent adhesion performance test. The results are shown in Table 2.

The results of measurement of the amount of tannin in the bark are shown in Table 1.

TABLE 1

| | Classified ground bark having a diameter of less than 63 µm obtained in step (ii) | Finely pulverized bark obtained in step (iii) |
|---|---|---|
| Yield of methanol extract (%) | 46.2 | 61.9 |
| ASV (%) of methanol extract | 91.2 | 85.1 |
| Amount of tannin (%) = Yield of methanol extract × ASV | 42.1 | 52.7 |

On the basis of Table 1, the amount of tannin in the finely pulverized bark obtained in step (iii) is more than the amount of tannin in the classified ground bark having a diameter of less than 63 µm obtained in step (ii). From the results, the tannin contained in the finely pulverized bark obtained in step (iii) is understood to facilitate the extraction of tannin more than the classified ground bark having a diameter of less than 63 µm obtained in step (ii), or in other words, is present in a form that facilitates use in adhesion.

TABLE 2

|  |  | Example 1 | Example 2 | Example 3 | Example 4 | Example 5 | Example 6 | Example 7 | Example 8 |
|---|---|---|---|---|---|---|---|---|---|
| Solid content in the adhesive | Component (A): Solid content of phenolic resin (parts by mass) | 90 | 80 | 70 | 60 | 50 | 40 | 30 | 20 |
|  | Component (B): Finely pulverized radiate pine bark (parts by mass as dry weight) | 10 | 20 | 30 | 40 | 50 | 60 | 70 | 80 |
| Measured values of adhesive | Viscosity of adhesive (Pa · s) (23° C.) | 1.1 | 1.3 | 3.1 | 2.5 | 2.7 | 3.1 | 2.2 | 2.8 |
|  | Liquid glue solid content percentage (%) | 47 | 39 | 39 | 33 | 30 | 27 | 24 | 21 |
| Result of adhesion performance test | Average shear strength (MPa) | 1.1 | 1.0 | 1.0 | 1.1 | 0.7 | 0.7 | 0.7 | 0.7 |
|  | Average wood failure (%) | 91 | 91 | 89 | 91 | 58 | 33 | 21 | 28 |
|  | Judgement of test results | PASS | PASS | PASS | PASS | PASS | PASS | PASS | PASS |

From the result of Table 2, the adhesive of the present invention has favorable adhesion performance since it was determined to be PASS on the basis of the adhesion performance test of the Japanese Agricultural Standards (JAS) for plywood, and the adhesives of Examples 4 to 8, in which the proportion of the phenolic resin solid content was reduced in the liquid glue solid content, were also determined to be PASS on the basis of the adhesion performance test of the JAS for plywood. In addition, although the liquid glue solid content percentage in the adhesives decreased as the proportion of component (B) increased, the adhesives demonstrated that adhesion performance was able to be determined as PASS based on the adhesion performance test of the JAS for plywood regardless of the liquid glue solid content percentage being low.

Figure 1:
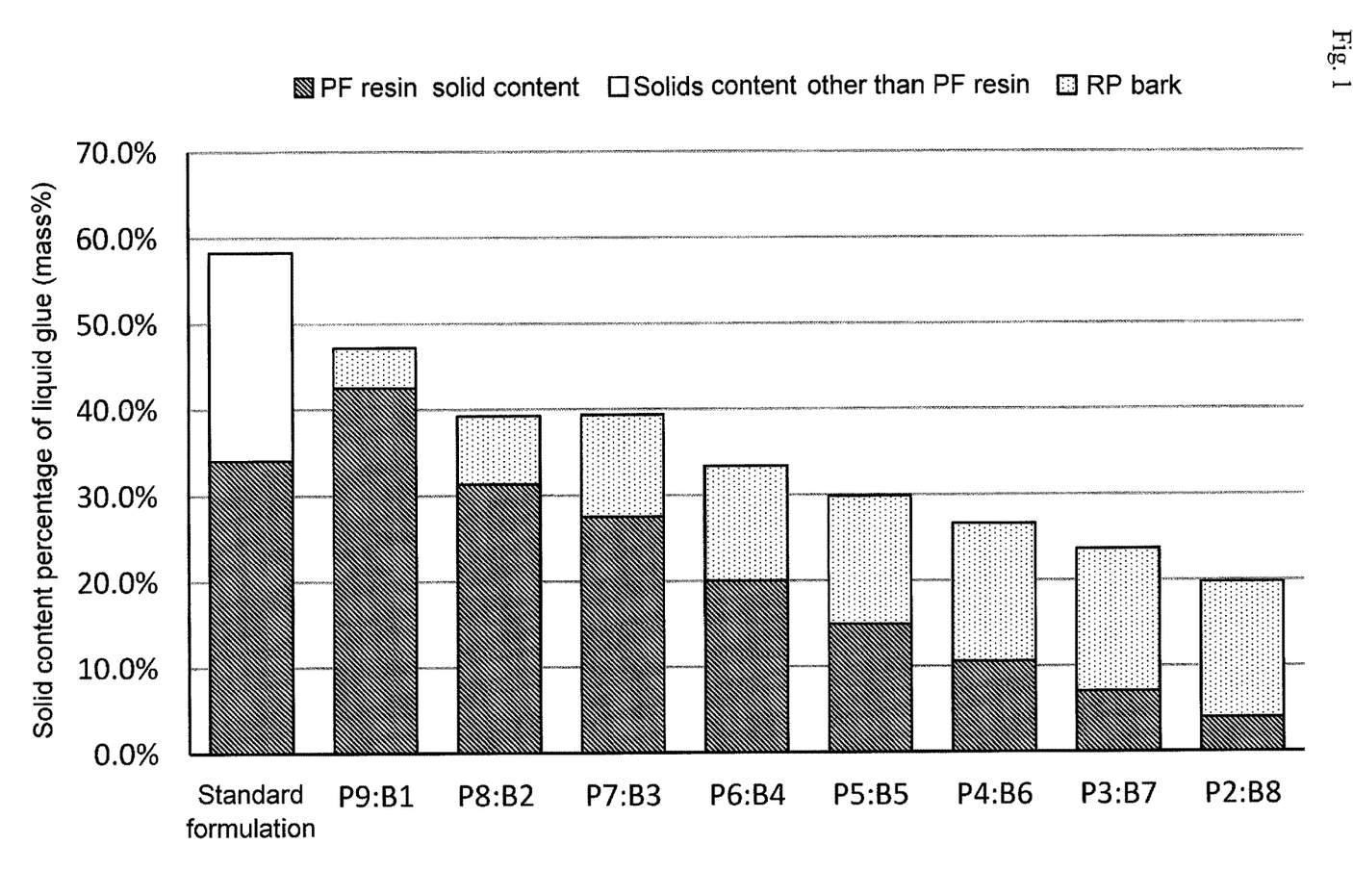
FIG. 1 is a graph showing a comparison of the solid content percentage of the component (A) and the solid content percentage of the component (B) in terms of dry matter present in the liquid glues of Examples with those of the prior art.
Figure 2:
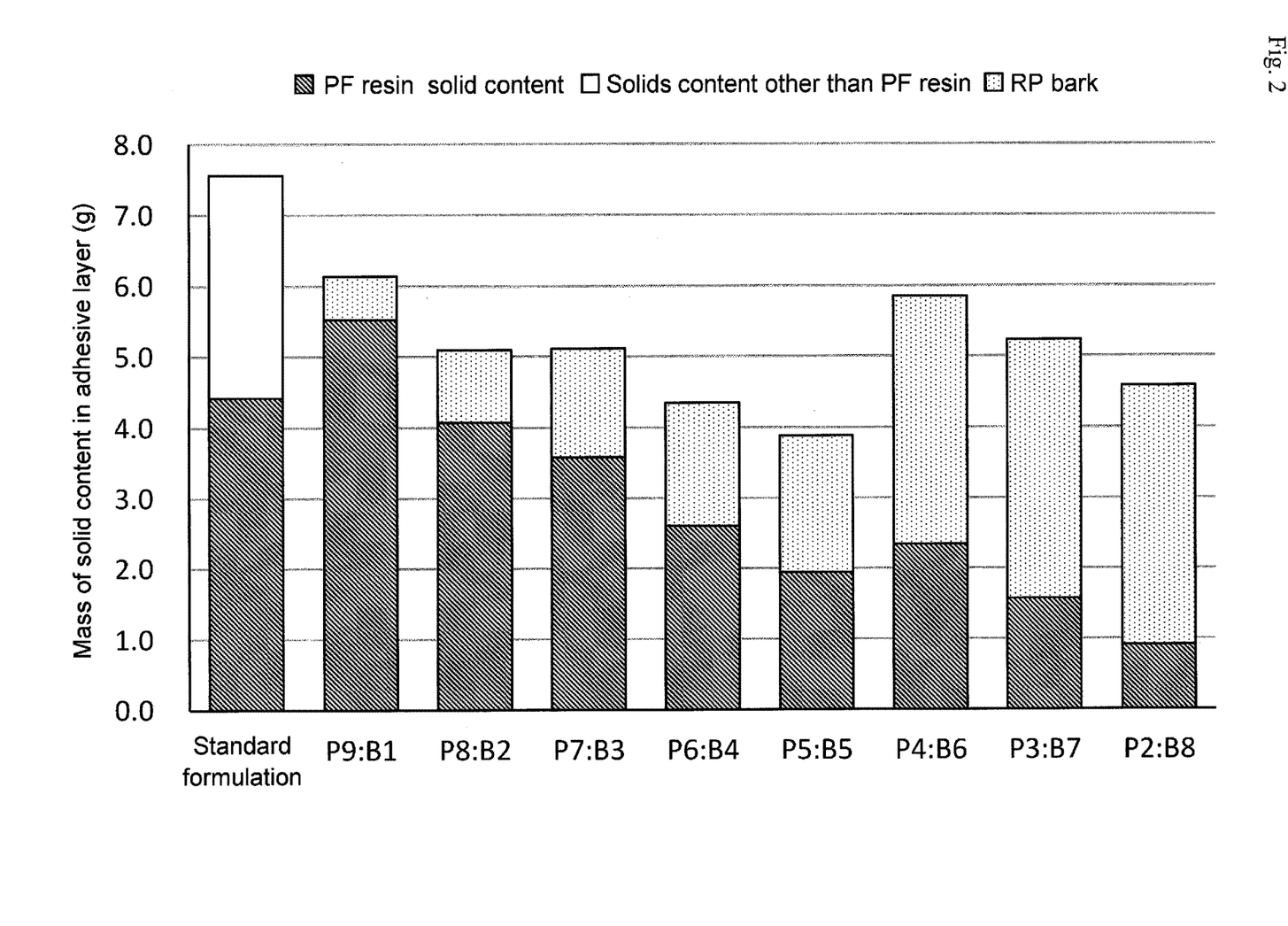
FIG. 2 is a graph showing a comparison of the mass of the solid content of component (A) and the component (B) in terms of dry matter present in the adhesive layer of Examples with those of the prior art.

The aforementioned results are graphically represented in FIGS. 1 and 2.

In the graphs, "PF resin" and "P" indicate phenolic resin, while "RP bark" and "B" indicate *radiata* pine finely pulverized bark. The "standard formulation" refers to a composition of an ordinary adhesive for wood adhesion containing only phenolic resin as the adhesive component.

FIG. 1 is a graph showing a comparison of the solid content percentage of component (A) and the solid content percentage of component (B) in terms of dry matter present in the liquid glue content of each of Examples with those of the prior art. It is found that as the proportion of the solid content of component (B) in terms of dry matter in the solid content increases, the liquid glue solid content percentage can be decreased in the case, when the viscosity is adjusted within a prescribed range.

FIG. 2 is a graph showing a comparison of the masses of the solid content of component (A) and the component (B) in terms of dry matter in the adhesive layer of each of Examples with those of the prior art. FIG. 2 differs from FIG. 1 in that the spread amount is also taken into consideration. From the graph, it is found that as the proportion of the component (B) in terms of dry matter in the solid content is increased, the total mass of the solid content of component (A) and the component (B) in terms of dry matter in the adhesive layer increases depending on the spreading method but adhesion is possible even when the mass of the solid content in the adhesive layer is less than standard formulation, It is also found that the mass of the solid content of component (A), that is, an adhesive resin, can be reduced to roughly one-fifth that of the standard formulation by increasing the mass of the component (B) in terms of dry matter.

It has been confirmed that as compared with the standard phenolic resin adhesive shown as prior art, adhesion performance evaluated as PASS is achieved even in Examples in which the proportion of the solid content of the phenolic resin in the liquid glue solid content is low.

Production Example 2

Production of Finely Pulverized Bark (Step i): Dried *radiata* pine bark was roughly ground with a garden shredder and then pulverized with a hammer mill equipped with a 1 mm opening screen (metallic mesh).

(Step ii): This step was omitted. That is, all ground bark obtained in step i were not classified and directly used in step iii.

(Step iii): 1 kg of bark obtained in step i was immersed in 3 L of water overnight at room temperature followed by being finely pulverized using a disk mill (Supermasscolloider MKZA10-15J, Masuko Sangyo Co., Ltd.) to obtain an aqueous suspension of finely pulverized bark. The resulting aqueous suspension of finely pulverized bark contained cellulose nanofibers.

In this case, finely pulverizing the bark was finely pulverized with the disk mill for 3 passes, during which the gap between two disks was decreased stepwise finally to 40 μm.

Examples 9 to 16

Adhesives were obtained by mixing a phenolic resin (trade name: Deernol D-117, Oshika Corp.) with the aqueous suspension of finely pulverized bark at the proportions of the solid contents in the adhesive shown in Table 3 followed by adjusting the viscosity with water to the values shown in Table 3.

The obtained adhesive was spread onto one surface of a rotary lathe-cut single board made of *radiata* pine at a spread amount of 200 g/m$^2$, and the obtained adhesive was spread also onto another rotary lathe-cut board made of *radiata* pine at a spread amount of 200 g/m$^2$, and then the two boards were laminated by joining the adhesive-spread surfaces thereof to obtain a laminate of two layers. The obtained adhesive was spread onto one surface of still another rotary lathe-cut single board made of *radiata* pine at a spread amount of 200 g/m$^2$. The obtained adhesive was spread onto one surface of the laminate of two layer with adhesive of a spread amount of 200 g/m$^2$, and the laminate of two layers and the still another board were laminated by joining the adhesive-spread surfaces thereof to obtain a laminate of three layers and the resulting laminate was subjected to cold pressing for 30 minutes at room temperature and 1 MPa followed by being closed-assembled for 60 minutes and being subjected to hot pressing for 10 minutes at 135° C. and 1 MPa to obtain a test specimen of three layers with nearby fiber direction of single board being right angle.

Test pieces were cut off from the test specimen and then underwent adhesion performance test. The results are shown in Table 3.

TABLE 3

| | | Example 9 | Example 10 | Example 11 | Example 12 | Example 13 | Example 14 | Example 15 | Example 16 |
|---|---|---|---|---|---|---|---|---|---|
| Solid content in the adhesive | Component (A): Solid content of phenolic resin (parts by mass) | 90 | 80 | 70 | 60 | 50 | 40 | 30 | 20 |
| | Component (B): Finely pulverized radiate pine bark (parts by mass as dry weight) | 10 | 20 | 30 | 40 | 50 | 60 | 70 | 80 |
| Measured values of adhesive | Viscosity of adhesive (Pa · s) (23° C.) | 0.6 | 0.5 | 1.7 | 1.6 | 2.0 | 1.6 | 1.4 | 3.1 |
| | Liquid glue solid content percentage (%) | 41% | 40% | 36% | 35% | 30% | 26% | 24% | 27% |
| Result of adhesion performance test | Average shear strength (MPa) | 1.2 | 1.2 | 1.1 | 1.1 | 0.9 | 0.7 | 0.7 | 0.7 |
| | Average wood failure (%) | 82% | 60% | 72% | 77% | 65% | 10% | 31% | 28% |
| | Judgement of test results | PASS | PASS | PASS | PASS | PASS | PASS | PASS | PASS |

Examples 17 and 18

Adhesives were obtained by mixing a phenolic resin (trade name: Deernol D-117, Oshika Corp.) with the aqueous suspension of finely pulverized bark at the proportions of the solid contents in the adhesive shown in Table 4 followed by adjusting the viscosity with water to the values shown in Table 4.

Test specimen was prepared by using a rotary lathe-cut single board made of *Chamaecyparis obtusa* and *Larix kaempferi* instead of lathe-cut single board made of *radiata* pine in the same manner of Example 12. Test pieces were cut off from the test specimen and then underwent adhesion performance test.

The results are shown in Table 4.

TABLE 4

| | | Example 12 | Example 17 | Example 18 |
|---|---|---|---|---|
| The species or tree of the adherent | | Radiate pine | *Chamaecyparis obtusa* | *Larix kaempferi* |
| Solid content in the adhesive | Component(A): Solid content of phenolic resin (parts by mass) | 60 | 60 | 60 |
| | Component(B): Finely pulverized radiate pine bark (parts by mass as dry weight) | 40 | 40 | 40 |
| Measured values of adhesive | Viscosity of adhesive (Pa · s) (23° C.) | 1.6 | 1.9 | 1.9 |
| | Liquid glue solid content percentage (%) | 35% | 34% | 34% |
| Result of adhesion performance test | Average shear strength (MPa) | 1.1 | 1.2 | 1.0 |
| | Average wood failure (%) | 77% | 23% | 95% |
| | Judgement of test results | PASS | PASS | PASS |

The invention claimed is:

1. An adhesive comprising at least one adhesive resin (A) selected from the group consisting of phenolic resins, urea resins, and melamine resins, and bark (B) pulverized without extracting tannin and without delignification to the extent that cellulose nanofibers are extracted,
wherein the average diameter of the cellulose nanofibers is 1 nm or more and less than 1,000 nm.

2. The adhesive according to claim 1, wherein the bark for the component (B) is the bark of a tree species belonging to at least one family selected from the group consisting of Pinaceae, Cupressaceae, Mimosoideae, Fagaceae, Salicaceae, Myrtaceae, Malvaceae, Acanthaceae, Malpighiaceae, Meliaceae, Euphorbiaceae, Sonneratiaceae and Rhizophoraceae.

3. The adhesive according to claim 1, comprising 20 parts by mass or more of the component (B) in terms of dry matter based on 100 parts by mass of a total of the solid content of the component (A) and the component (B) in terms of dry matter.

4. The adhesive according to claim 1, wherein the bark for the component (B) is *radiata* pine bark, and the adhesive comprises 40 parts by mass or more and less than 90 parts by mass of the component (B) in terms of dry matter based on 100 parts by mass of a total of the solid content of the component (A) and the component (B) in terms of dry matter.

5. A veneer-based material laminated by the adhesive according to claim 1.

6. A process for manufacturing an adhesive comprising at least one adhesive resin selected from the group consisting of phenolic resins, urea resins, and melamine resins, and finely pulverized bark containing cellulose nanofibers, which comprises
step (I) of grinding the bark,
optional step (II) of classifying the ground bark,
step (III) of finely pulverizing the ground bark obtained in step (I) or the classified ground bark obtained in step (II), and
step (IV) of mixing at least one adhesive resin selected from the group consisting of phenolic resins, urea resins and melamine resins with the finely pulverized bark obtained in step (III),
wherein in the step (III), immersing the ground bark obtained in step (I) or the classified ground bark obtained in step (II) in water and then finely pulverizing them with the immersing water, wherein the average diameter of the cellulose nanofibers in the adhesive is 1 nm or more and less than 1,000 nm,
and the process does not include a step of extracting tannin with hot water or base, or a delignification step of removing lignin.

7. The process for manufacturing the adhesive according to claim 6 wherein in the step (III), immersing the ground bark obtained in step (I) or the classified ground bark obtained in step (II) in water which is not more than 10 times the volume of them, and then finely pulverizing them with the immersing water.

* * * * *